Sept. 25, 1934.   R. L. CRIM   1,975,059
POWER BRAKE MECHANISM
Filed March 19, 1932   2 Sheets-Sheet 1
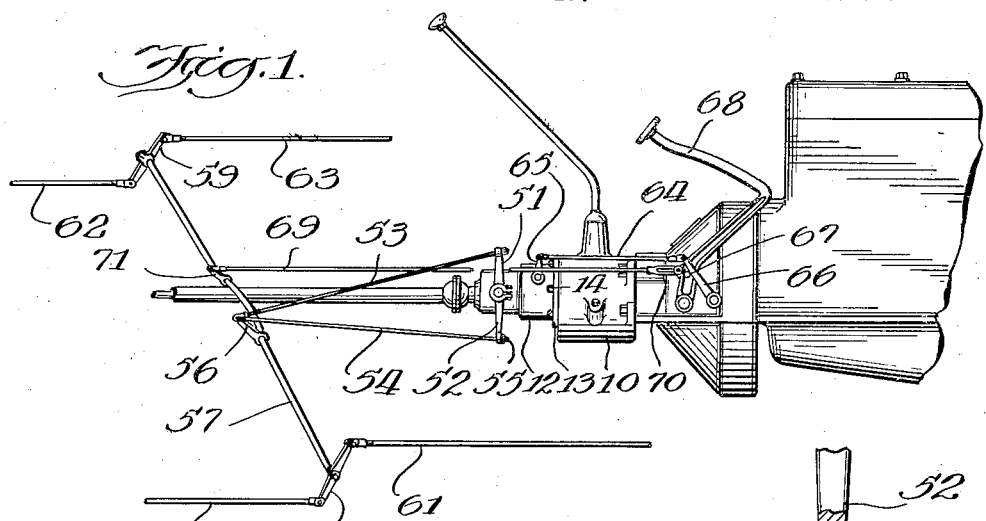
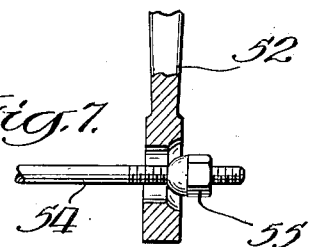
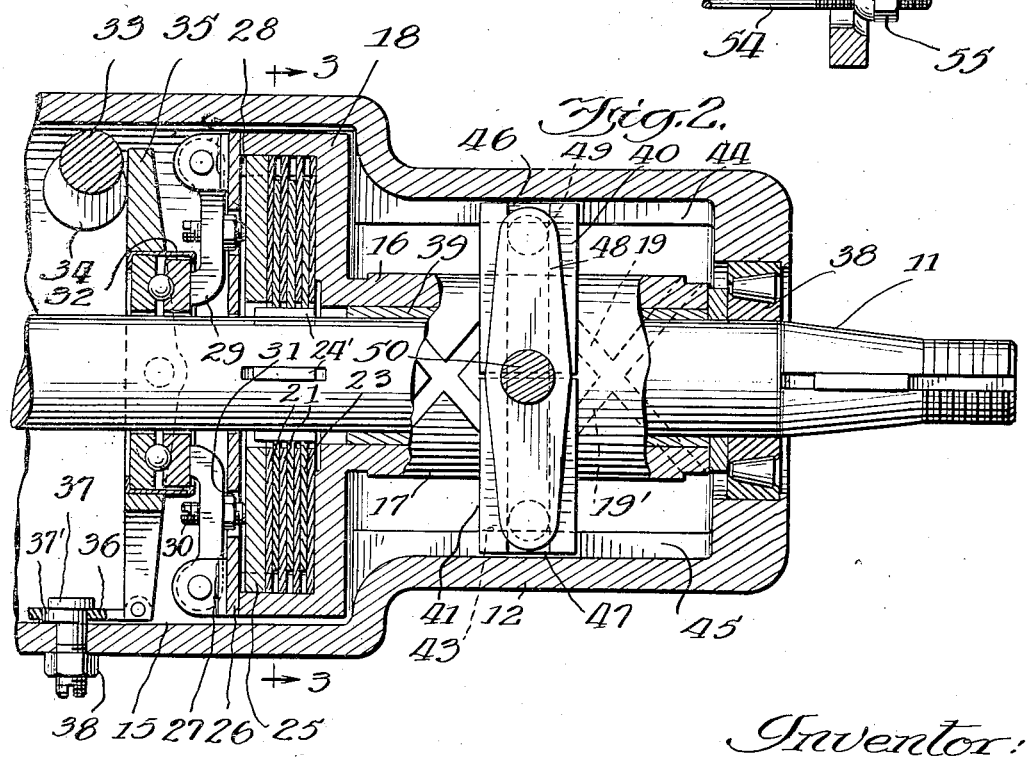
Inventor:
Robert L. Crim
By Maurice S. Cayne
Atty.

Sept. 25, 1934.   R. L. CRIM   1,975,059
POWER BRAKE MECHANISM
Filed March 19, 1932   2 Sheets-Sheet 2
Fig. 3.
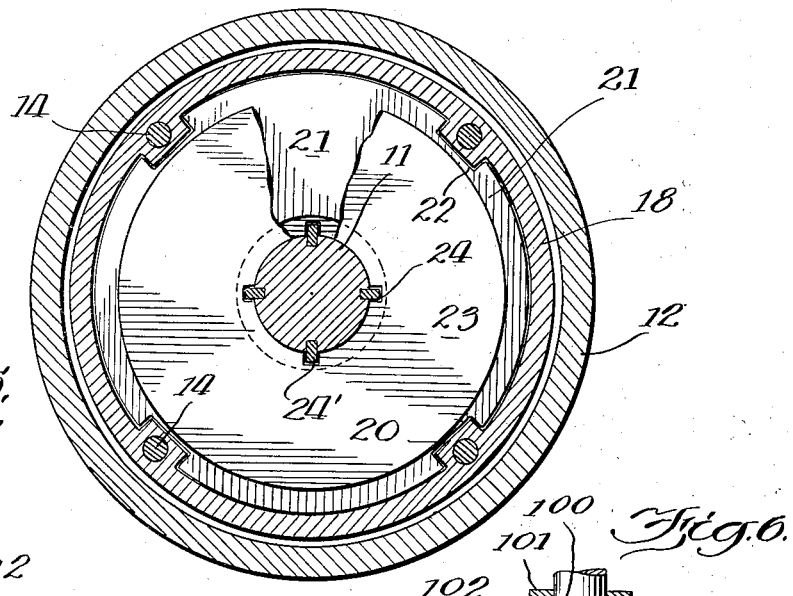
Fig. 5.
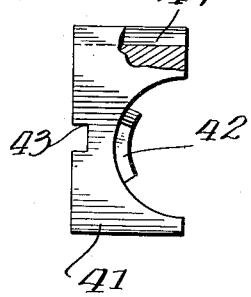
Fig. 6.
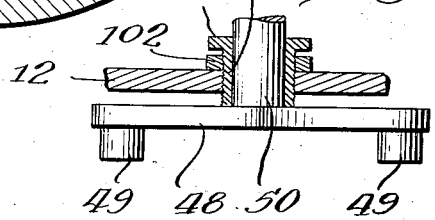
Fig. 4.
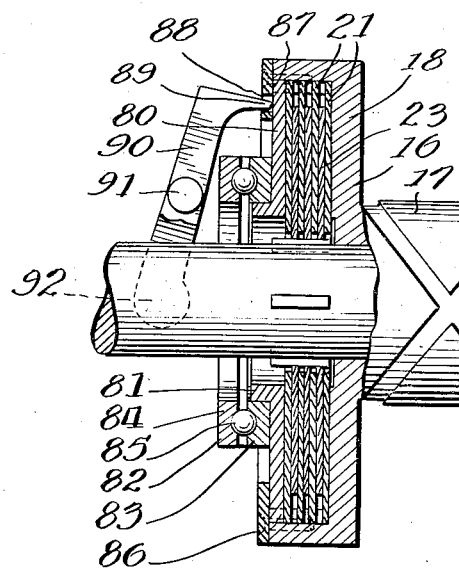
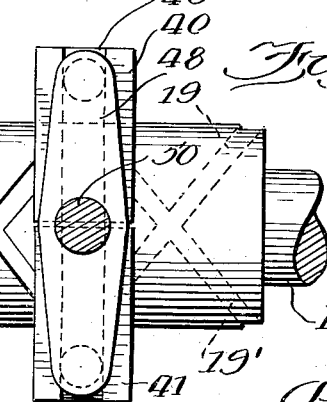
Inventor:
Robert L Crim
By Maurice S. Cayne
Atty.

Patented Sept. 25, 1934

1,975,059

UNITED STATES PATENT OFFICE 1,975,059

POWER BRAKE MECHANISM

Robert L. Crim, Evanston, Ill., assignor of one-half to Maurice S. Cayne, Chicago, Ill.

Application March 19, 1932, Serial No. 599,927

4 Claims. (Cl. 188—140)

This invention relates to brake operating mechanism for motor vehicles and the like, and more particularly to a power operating mechanism therefor.

The main object of the invention is to provide a brake operating mechanism in which the brake applying force is derived from the motion of a rotary part of the vehicle.

Another object of the invention is to provide a device of the character described, which is capable of accurate control with slight muscular effort on the part of the operator and is continuously under the control of the operator.

A further object of this invention is to provide a power brake mechanism of the character described, in which the brake applying force is derived from the motion of a rotary part of the vehicle, with the result that the force required to control the application of the brakes is a small fraction of the brake applying force.

A still further object of this invention is to provide a brake power mechanism of the character described, which is equally effective in operation whether the vehicle is going forward or backward.

A still further object of this invention is to provide a power brake operating mechanism, having associated therewith a unit adapted for multiplying the force disposed between the driving and controlling means and the brake mechanism, whereby the driving and controlling means may be small and light, and the control will be flexible and accurate.

A still further object of this invention is to provide a power brake operating mechanism having associated therewith a force multiplying unit, the elements of which are normally stationary, and are in operation only when the brakes are being applied.

A still further object of this invention is to provide a power brake operating mechanism for a motor vehicle, said mechanism being actuated by the usual brake pedal, and means associated with said brake pedal for actuating said power brake mechanism upon the initial application of pressure thereon, and to bring into play the usual brake operating mechanism upon the exertion of further pressure thereon.

A still further object of this invention is to provide brake operating mechanism for a motor vehicle, including the usual brake mechanism in addition to a brake mechanism, the applying force of which is derived from the motion of a rotary part of a vehicle, both of said brake mechanisms being operated by the usual brake pedal, the power operated brake mechanism being brought into braking position when only a slight muscular effort is exerted on the brake pedal, and the usual brake mechanism is brought into operating position upon the exertion of a greater muscular effort than is necessary for actuating the power brake mechanism.

A still further object of this invention is the provision of a power brake operating mechanism, including a force multiplying unit, the elements of which are normally stationary, and are in operation only when the brakes are being applied, and means associated with said force multiplying unit for locking the same against rotary movement, said locking means being released upon the application of pressure to the brake pedal.

With the foregoing and other objects in view, which will appear as the description proceeds, the invention consists in the arrangement and combination of parts hereinafter more fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction and assembly, and many of its advantages should be readily understood and appreciated.

Referring to the drawings in which similar characters of reference are employed to indicate corresponding parts throughout the several figures of the drawings:—

Figure 1 is a view in perspective of my improved brake unit, assembled in operative relation with the automobile transmission;

Figure 2 is a transverse sectional view through the power operating unit;

Figure 3 is a view taken on line 3—3 of Figure 2;

Figure 4 is a view similar to Figure 2 of a modified form of power operating unit with the housing therefor eliminated;

Figure 5 is an elevational view of one of the nut members associated with my power operating unit;

Figure 6 is a detailed view of the element actuated by the operation of the nut members for actuating the brake mechanism; and Figure 7 is a view of a further detail of construction.

Referring to the drawings more specifically by characters of reference, the numeral 10 designates generally the usual change speed transmission casing of a motor vehicle having the drive shaft 11 extending therethrough. An auxiliary housing 12 for my improved power brake unit is provided with a flanged head 13, by means of which the housing 12 is secured to the end of the transmission casing 10 by any suitable means, such for example as the screws 14 or the like.

In the embodiment illustrated the housing 12 is enlarged at its forward end as shown at 15, in which enlarged portion is adapted to be mounted a disc clutch to be presently more fully described. The drive shaft 11 is adapted to extend through the housing 12 and has mounted thereon for rotary movement the member 16, which member is provided with a shank portion 17 and a hollow head portion 18. The shank portion 17 is provided with two sets of oppositely inclined spiral grooves 19 and 19' along the full length thereof.

Within the hollow head portion 18 is mounted my improved disc clutch which comprises a plurality of steel discs, some of which are smaller in diameter than others, said smaller discs being keyed to the shaft 11, while the larger discs are mounted within the head member 18 so as to rotate therewith, but to be free for sliding movement therein. As shown more clearly in Figure 3 of the drawings, the member 18 is provided on the inner periphery thereof with the inwardly extending lugs 20, while the larger discs 21 are provided with the slots 22 on their outer periphery, said slots being adapted for receiving therein the lugs 20 when the clutch is in assembled position.

The smaller disc members 23 are provided on their inner periphery with the slots 24, which slots are adapted to receive the keys 24' when said discs 23 are mounted in operative position on the shaft 11. In assembling the clutch mechanism the discs 21 and 23 are alternately arranged on the shaft, the larger inner disc resting against the bottom inner face of the head member 18. By reason of this arrangement it will be noted that the smaller discs 23 will rotate with the drive shaft 11, whereas the larger discs 21 will rotate with the member 16.

A plate member 25 is disposed within the head member 18 against the outer one of the disc members, said plate member 25 being adapted for sliding movement within the head member 18. To complete the assembly of the clutch mechanism, a plate member 26 is rigidly secured to the outer free end of the head member 18 in any suitable manner, such for example as by means of the screws 27 or the like, there being normally provided the clearance 28 between the inner face of the cover member 26 and the plate member 25. Pivotally secured adjacent the outer edge of the cover member 26 are a plurality of fingers 29, said fingers being provided intermediate their ends with lugs 30, which lugs are adapted to extend through the openings 31 provided in said cover member 26 for engaging the plate member 25 to force the same to move the clutch discs 21 and 23 into operative position. The free ends of the pivoted fingers 29 are disposed so as to be in contacting engagement with a thrust bearing 32, which is adapted for exerting pressure against said fingers to move the studs 30 against the disc 25 for actuating the clutch mechanism.

In order to operate the clutch mechanism just described, there is provided a cross shaft 33, which is journaled in the housing 12 and has provided thereon intermediate the ends thereof a cam 34, which is adapted to engage a member 35, which is connected to the thrust bearing 32. The lower end of the member 35 is pivotally secured to a plate member 36, which is adjustably mounted within the housing by means of the bolt 37 and the nut 38. As shown in Figure 2 of the drawings, the bolt 37 is provided adjacent its head portion with a cam 37', which is received in an opening provided therefor in the member 36. By actuating the bolt 37 in the desired direction the position of the plate member 36 may be adjusted, thereby adjusting the position of the member 35 with relation to the cam portion 34 on the cross shaft 33. The lugs 30 provided in the fingers 19 are also adjustably mounted whereby these may be readily adjusted to regulate the amount of pressure necessary to exert on the foot pedal in order to bring the clutch into operative position. An anti-friction bearing 38 is provided in the rear end of the housing 12 to permit the free rotation of the shaft 11 in the end of the housing 12. If desired, the shank or hub portion of the member 16 may be mounted on a suitable bushing 39, to facilitate in the rotary movement of the same on the shaft 11.

Mounted upon the threaded shank or hub 17 are two semi-cylindrical nut members 40 and 41, on the inner face of each one of which is provided a suitably disposed inclined lug 42, which is adapted to be received in the spiral grooves 19 and 19' to coperate therewith. The nut members 40 and 41 are provided with longitudinally extending grooves 43, which are adapted to receive and slide on longitudinal ribs 44 and 45 provided on the inner side walls of the housing 12, so that the nut members are prevented from rotating with the hub 16 when the latter is connected with the shaft 11 by means of the clutch mechanism. Any rotation of the member 16 will cause the nut members to move longitudinally in opposite directions, the nut members 40 moving along the groove 19 and the nut member 41 along the groove 19'.

The nut members 40 and 41 are provided on one of their ends with the transverse grooves 46 and 47, which grooves are adapted to be in substantially vertical alignment with each other when the said members are in their central or neutral position as shown in Figure 2 of the drawings. A cross member 48 having the cylindrical lugs 49 adjacent each end thereof is disposed adjacent said nut members, with the lugs 49 received for sliding movement within the grooves 46 and 47. To the member 48 is rigidly secured intermediate its ends the rod 50, which extends through the wall of the housing 12, and has rigidly secured thereto the cross arms 51 and 52, whereby any rotary movement imparted to the member 48 by reason of the movement of the nut members in opposite directions will be transmitted to the cross arms 51 and 52.

The opening through which the rod 50 extends is provided with a threaded bushing 100, the free end of which is adapted to extend into the housing 12 and to engage the member 48 to hold the latter in operating position with respect to the nut members 40 and 41. The bushing 100 has provided on the outer ends thereof a hexagonal nut 101, by means of which the said bushing may be threaded into and out of the opening in which it is mounted, there being also provided a jam nut 102 for locking the bushing in the desired adjusted position. By reason of this construction it will be apparent that the bushing 100 may be adjusted to bring the lugs 49 into proper position with respect to the inner wall of the grooves 46 and 47 in the nut members 40 and 41, within which said lugs 49 are adapted to ride.

The free ends of the arms 51 and 52 are provided with slotted countersunk openings, through which are adapted to extend the rods 53 and 54 respectively, upon the free end of each one of which is provided a ball nut 55, which is adapted to be received in the countersunk opening, which is of a size to prevent the nut from passing through said opening. The opposite ends of the rods 53 and 54 are connected with an arm 56, fixed in any suitable way to the usual brake operating cross shaft 57, mounted in the side rails of the chassis (not shown) and connected to operate the brakes of the vehicle in any preferred manner, as by means of the levers 58 and 59, and the links 60, 61, 62 and 63.

A drag link 64 is connected by means of an arm 65 with the cross shaft 33. The other end of the drag link 64 is connected to one end of an arm 66, the lower end of which is pivotally secured to a portion of the transmission housing as shown in Figure 1 of the drawings. The arm 66 is disposed in position to be engaged by a transverse pin 67, secured to the usual foot pedal 68, whereby upon the application of pressure on the foot pedal the pin 67 will engage the arm 66 to swing the latter about its pivot, thereby causing a pull on the drag link 64, which in turn will actuate the arm 65 to rotate the shaft 33, to bring the cam portion 34 thereon into engagement with the member 35 for causing the latter to press against the fingers 29 to actuate the clutch mechanism for connecting the drum member 16 with the drive shaft 11.

In addition to the power brake mechanism just described, there is also provided the usual conventional form of brake mechanism, which comprises the drag link 69, one end of which is connected by means of an elongated slot 70 with the foot pedal 68, and the other end of which is connected to an arm 71 rigidly connected to the cross shaft 57.

From an inspection of Figure 1, it will be apparent that upon the initial application of pressure on the foot pedal 68, the arm 66 will be actuated to operate the clutch mechanism for connecting the drum member 16 to the drive shaft 11. When this takes place, the nut members 40 and 41 will be caused to slide in opposite directions, resulting in a rotary movement being imparted to the cross arms 51 and 52, which will cause a pull on either the rod 53 or 54, depending upon the direction of rotation of the arms 51 and 52, which pull will actuate the brake mechanism to apply the brakes to the vehicle. The drag link is provided for the purpose of safety should the power brake mechanism fail to operate. In that event it will be necessary to exert the usual pressure on the foot pedal, in which case the pin 67 will eventually slide past the arm 66, and any pressure exerted on the foot pedal will cause a pull direct on the drag link 69, causing the application of the brakes in the usual and conventional manner.

The operation of the device is as follows:—

The drive shaft 11 will be constantly rotating when the vehicle is in motion, but by reason of the separation of the discs 21 and 23 the drum member 16 will remain stationary. When the operator desires to apply the brakes, he presses forwardly slightly on the brake pedal 68, which causes the pin 67 to engage the arm 66 to swing the latter to exert a pull on the drag link 64, which in turn will actuate the arm 65 for rotating the shaft 33 to bring the cam 34 into engagement with the member 35, to force the discs 21 and 23 into frictional engagement with each other and with the drum head 18. Upon the actuation of the clutch, power will be transmitted from the shaft 11 to the member 16, causing the latter to rotate and to move the nut members 40 and 41 longitudinally in opposite directions.

The relative movement of the nut members will cause the cross member 48 to rotate in either a clock-wise or anti-clockwise direction, depending upon the rotation of the shaft 11, carrying with it in the same direction the arms 51 and 52 for exerting a pull on either the rod 53 or 54 for accomplishing the operation of the brakes through the arm 56, shaft 57 and links 60 to 63 inclusive. When the brake pedal is released by the operator, the clutch discs will be separated and the usual brake releasing springs (not shown) will then swing the arms 51 and 52 in the reverse direction, thus sliding the nut members back to their original central position.

In the embodiment illustrated in Figure 4, the power unit is of substantially the same construction as that illustrated in Figure 2, with the exception of the clutch actuating means. In this embodiment there is shown the drive shaft 11, upon which is mounted the member 16, which consists of the hollow head portion 18 and the hub portion 17, said hub portion being provided with the spiral grooves 19 and 19', and has mounted thereon the semi-cylindrical nut members 40 and 41, said members having the transverse grooves 46 and 47 provided in one of their ends, within which grooves are adapted to be received the lugs 49 of the member 48, which member has extending therefrom the rod 50, which extends through the wall of the housing and to the free end of which are connected the cross arms 51 and 52, in a manner thereinbefore described in connection with the embodiment illustrated in Figure 2.

In the hollow head portion 18, is mounted the disc clutch which comprises the larger discs 21, which are disposed for rotary motion with the hollow head member 18 and the smaller discs 23 which are keyed to the shaft 11 for rotary movement therewith. The assembly of the said discs is similar to that described in connection with the embodiment shown in Figure 3, that is, the said discs are alternately arranged on the shaft 11 with the larger discs being keyed to the hollow head member 18 and the smaller discs to the shaft.

To complete the assembly of the clutch mechanism there is provided the plate member 80, which is also secured to the hollow head member so as to rotate therewith, but to be permitted for sliding movement therein. On the central portion of the plate member 80 surrounding the central opening therein is provided an outwardly extending annular flange 81, upon which is mounted the anti-friction thrust bearing 82, comprising the plate members 83 and 84, between which are mounted the ball bearings 85. The plate member 83 of the thrust bearing is adapted to rotate with the plate member 80. An annular ring 86 is secured to the free outer edge of the hollow head 18, by means of the screws 87, or in some other suitable manner. The ring 86 is provided with an arcuate slot 88 extending therethrough, within which opening is adapted to be received the forward end 89 of a yoke 90 when the member 16 is in its neutral position. The yoke 90 is secured intermediate its ends to a cross shaft 91, which is adapted for actuation by the drag link 64, said shaft 91 being journaled in the housing, whereby the actuation of said shaft by means of the drag link 64 will cause a swinging movement of the yoke 90. The lower portion of the yoke 90 is forked to embrace the shaft 11 and is provided with the portions 92, which are adapted to cooperate with the anti-friction thrust bearing 82, mounted on the clutch mechanism for actuating said clutch mechanism.

The operation of the modified form illustrated in Figure 4 will be as follows:—

When the operator desires to apply the brakes, he presses forward slightly on the brake pedal which causes the rod 91 to swing the yoke 90 to bring the lower portions 92 thereof into contacting engagement with the anti-friction thrust bearing 82, for forcing the discs 21 and 23 into clutch operating position. Power will thus be transmitted from the drive shaft 11 to the hub 17, causing the latter to rotate and to move the nut members 40 and 41 longitudinally in opposite directions. The longitudinal movement of said nut members will actuate the brake mechanism in the manner hereinbefore described in connection with the embodiment illustrated in Figure 2 of the drawings.

The provision of the yoke 90 in its locking engagement with the hollow head 18 is for the purpose of preventing any rotary movement of the hub 17, unless there has been pressure applied to the foot pedal. In other words, there is to be no rotary movement of said hub 17 except when the operator has applied pressure to the foot pedal for the purpose of actuating the brakes. During cold weather it is a well known fact that the oil disposed within the hollow head member between the discs 21 and 23 may become congealed to a point where the discs will freeze to each other, so that upon the starting of the motor rotation of the drive shaft 11 will impart, by reason of the frozen condition of said discs, a rotary movement to the hub 17, which will result in the application of the brakes. To eliminate this possibility the yoke member 90 is provided with the forward extension 89, which in its normal inoperative position will be disposed within the slot 88 for preventing the member 16 from rotating with the drive shaft 11, except when the foot pedal has been depressed.

When so constructed should the discs 21 and 23 become frozen to each other, the rotation of the drive shaft 11 will cause a release of the smaller discs 23 from the larger discs, since the head member 18 will be prevented from rotating with the shaft by reason of the locking engagement of the forward portion 89 of the yoke within the slot 88. Any seal, therefore, that may have been formed between the said discs due to the congealing of the oil disposed within the hollow head portion 18 will be immediately broken. It will be apparent that upon the application of pressure to the foot pedal the yoke 90 will be immediately moved to a position where it will release itself from the opening 88 to thereby permit the operation of the brake mechanism in the manner hereinbefore described. Also, upon the release of the foot pedal the usual brake releasing springs will bring the member 16 back to its neutral position, in which position the forward portion 89 of the yoke 90 will again be disposed in the opening 88. The ball nuts 55 provided on the rods 53 and 54 may be adjusted at desired times to make sure that in the neutral position the hollow head 18 will be so disposed with reference to the yoke 90, as to bring the opening 88 directly opposite the forward portion 89 of the yoke for receiving the same in its neutral locked position.

What I claim and desire to secure by Letters Patent of the United States is:—

1. In brake actuating mechanism for a motor vehicle, the combination with a shaft through which the drive is transmitted from a source of power to the road wheels, a clutch member surrounding said shaft and being adapted for rotation therewith in either direction, means for actuating said clutch member to engage the same with the said shaft, a two-way threaded sleeve surrounding said shaft and connected with said clutch member whereby the rotation of said clutch member will also result in a rotation of said sleeve, a pair of non-rotatable nut members threaded on said sleeve, said nut members being arranged so as to move relatively to each other axially of said sleeve upon rotation of said sleeve, means associated with said nut members for translating the relative axial movement thereof to rotary movement, said last mentioned means being connected with the brake operating mechanism for actuating the same.

2. In brake actuating mechanism for a motor vehicle, the combination with a shaft through which the drive is transmitted from a source of power to the road wheels, a clutch member surrounding said shaft and being adapted for rotation therewith in either direction, means for actuating said clutch member to engage the same with the said shaft, a two-way threaded sleeve surrounding said shaft and connected with said clutch member whereby the rotation of said clutch member will impart a rotary movement to said sleeve, a pair of non-rotatable nut members threaded on said sleeve, said nut members being arranged so as to move relatively to each other axially of said sleeve upon rotation of said sleeve, and means for transmitting the movement of said nut members to the brake operating mechanism for actuating the said brake operating mechanism.

3. In a brake actuating mechanism for a motor vehicle, the combination with a drive shaft, a clutch member surrounding said shaft and being adapted for rotation therewith in either direction, means for actuating said clutch member to engage the same with said shaft, said last mentioned means being adapted when in one position to engage the clutch member for preventing the rotation thereof with the shaft even though the latter be coupled thereto and when in another position to cause said clutch member to be coupled to the shaft for rotation therewith.

4. In a brake actuating mechanism for a motor vehicle, the combination with a drive shaft, a clutch member surrounding said shaft and being adapted for rotation therewith in either direction, means for actuating said clutch member to engage the same with said shaft, said last mentioned means being adapted when in one position to engage the clutch member for preventing the rotation thereof with the shaft even though the latter be coupled thereto and when in another position to cause said clutch member to be coupled to the shaft for rotation therewith, a two-way threaded sleeve surrounding said shaft and connected with said clutch member, whereby the rotation of said clutch member will also result in a rotation of said sleeve, a pair of non-rotatable nut members threaded on said sleeve, said nut members being arranged so as to move relatively to each other axially of said sleeve upon rotation of said sleeve, means associated with said nut members for translating the relative axial movement thereof to rotary movement, said last mentioned means being connected with the brake operating mechanism for actuating the same.

ROBERT L. CRIM.